United States Patent [19]

Izumi

[11] Patent Number: 5,109,297

[45] Date of Patent: Apr. 28, 1992

[54] APPARATUS FOR READING A PHOSPHOR PLATE IMAGE

[75] Inventor: Masaki Izumi, Yokohama, Japan

[73] Assignee: Eastman Kodak Company, Rochester, N.Y.

[21] Appl. No.: 515,145

[22] Filed: Apr. 26, 1990

[30] Foreign Application Priority Data

Sep. 4, 1989 [JP] Japan .................................. 1-228722

[51] Int. Cl.[5] ........................ G02B 26/08; H01J 3/14
[52] U.S. Cl. .................................. 359/216; 359/197; 250/235
[58] Field of Search ................................ 350/6.1–6.91, 350/479, 269–275; 250/239, 327.2, 347, 233–236; 358/55, 75, 80; 364/413.13

[56] References Cited

U.S. PATENT DOCUMENTS

| | | | |
|---|---|---|---|
| 4,203,672 | 5/1980 | Smith, Jr. | 250/235 |
| 4,205,350 | 5/1980 | Gunning | 250/235 |
| 4,272,151 | 6/1981 | Balasubramanian | 350/6.6 |
| 4,307,930 | 12/1981 | Saito | 350/6.6 |
| 4,343,531 | 8/1982 | Tateoka et al. | 350/479 |
| 4,484,073 | 11/1984 | Ohara et al. | 250/347 |
| 4,620,237 | 10/1986 | Traino et al. | 350/6.8 |
| 4,630,223 | 12/1986 | Schoon | 250/6.8 |
| 4,663,523 | 5/1987 | Swansbrg | 250/235 |
| 4,686,363 | 8/1987 | Schoon | 250/235 |
| 4,785,183 | 11/1988 | Tsuchino et al. | 250/327.2 |
| 4,837,588 | 6/1989 | Imakawa et al. | 250/235 |
| 4,877,955 | 10/1989 | Ono | 250/235 |
| 4,882,490 | 11/1989 | Takasaki et al. | 350/6.6 |
| 4,916,310 | 4/1990 | Furue et al. | 250/236 |
| 4,933,549 | 6/1990 | Fujioka et al. | 250/235 |

Primary Examiner—Bruce Y. Arnold
Assistant Examiner—Thong Nguyen
Attorney, Agent, or Firm—Edward Dugas

[57] ABSTRACT

A radiation image reading apparatus using a storage phosphor plate as a radiation image record is disclosd which includes a light beam scanning device, detection device and control device. The light beam scanning device generates a laser beam and scans the phosphor plate with the laser beam. The detection device detects a phosphor light from the phosphor plate generated by the irradiation of the laser beam and outputs an electrical image signal corresponding to the image information recorded at each of the pixels of the plate. The control device includes an optical shutter which is controlled so that the light beam from the scanning device is provided to generate only one beam spot for each of the pixels of the plate.

3 Claims, 3 Drawing Sheets

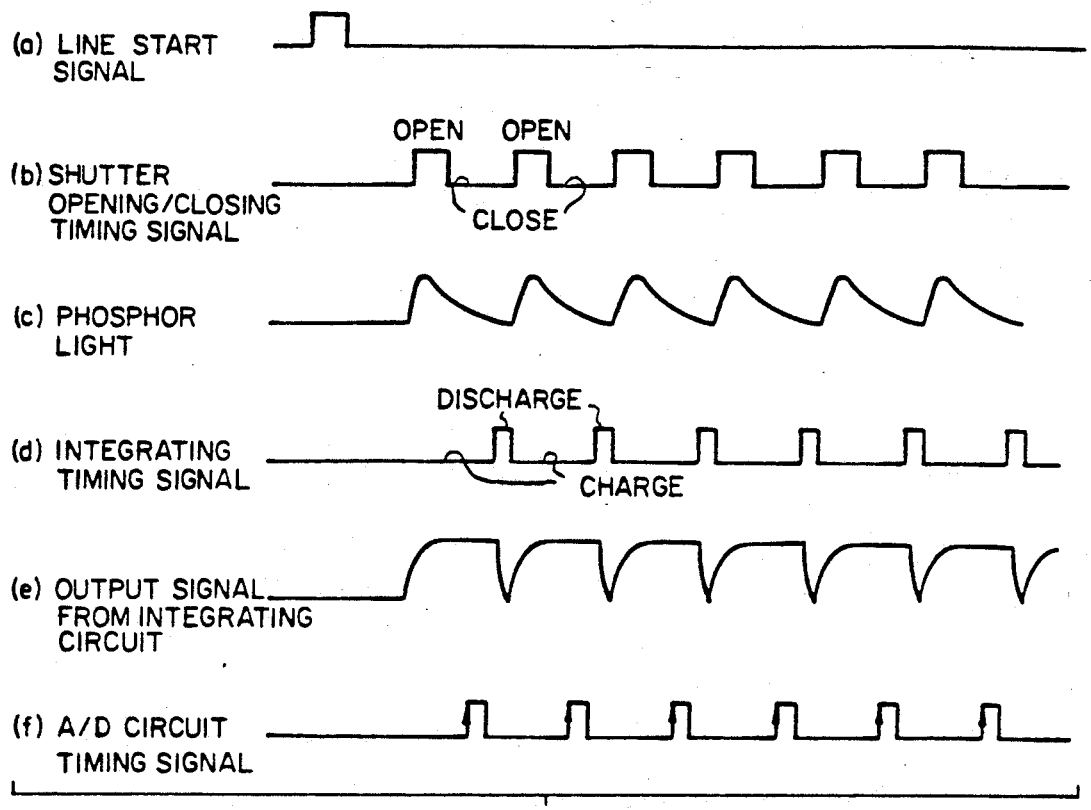
FIG. 5
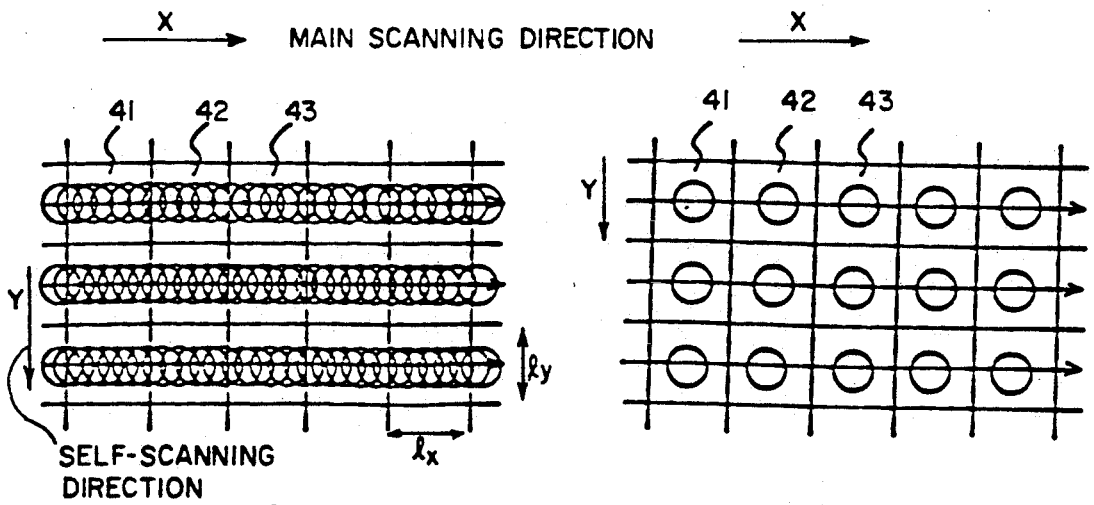
FIG. 2
FIG. 6

APPARATUS FOR READING A PHOSPHOR PLATE IMAGE

BACKGROUND OF THE INVENTION

1. Field of the Invention

The present invention relates to a radiation image reading apparatus and, more particularly, to a radiation image reading apparatus wherein a storage phosphor plate on which radiation image information is recorded is irradiated with excitation light and the light emitted from the phosphor plate is detected to read out the image information.

2. Description of the Prior Art

Radiation image reading apparatus is known where radiation image information of an object recorded on a storage phosphor plate known as an imaging plate (IP) is scanned with excitation light to generate accelerated light emissions, the light emissions are read out in sequence by a photoelectric means to generate image signals of the image, and the image is displayed by a suitable display apparatus as a visible image or recorded on a film as required. The image information is recorded by any means of radiation image recording techniques.

When using a phosphor plate for recording the radiation image, the required exposure to radiation, such as X-rays and the like, may be lowered by the light sensitivity of the storage phosphor, and the phosphor member may be repetitively used due to the recorded image being erasable, and further the image signals may be easily processed owing to the signals being processed in digital forms.

Such a radiation image reading apparatus according to the prior art is explained by referring to FIG. 1. In FIG. 1, numeral 1 designates a laser beam source, numeral 2 a light deflector such as a polygon mirror, a galvanometer mirror or the like, numeral 3 a plane mirror and numeral 4 a storage phosphor plate. The laser beam emitted from the laser beam source 1 is deflected linearly by means of the light deflector 2 as shown by an arrow a and scans over the phosphor plate 4 in the main scanning direction X by way of the plane mirror 3. Although not shown, the reading apparatus includes means for transferring the phosphor plate 4 in the sub-scanning direction Y which is perpendicular to the main scanning direction X, and since the phosphor plate 4 is moved by the transfer means in the direction Y, two dimensional scanning is achieved by the laser beam over the phosphor plate 4.

Numeral 5 designates a condenser, numeral 6 a filter which has such filtering characteristics as shutting the laser beam off and enabling only the phosphor radiation to be passed, and numeral 7 a photo-multiplier. The electric signals of the radiation image information which has been read through the condenser, filter 6 and photo-multiplier 7 are converted into digital electric signals by way of a current/voltage (I/V) converter 8, an amplifier 9 and an analog/digital (A/D) converter 10. A digital output is provided at output terminal 11. Numeral 12 is a line start sensor, and numeral 13 designates a timing circuit. The start sensor 12 is adapted to generate a line start signal to the timing circuit 13 when the laser beam is detected at the sensor 12. The timing circuit 13 is thereby energized to output an operational timing pulse train to the A/D converter circuit 10, so that the irradiation by the excitation light in the main scanning direction X and the operation of the A/D converter 10 may be synchronized.

When the scanning of the pixels in the first line is completed and the phosphor plate 4 is moved in the sub-scanning direction Y, the pixels in the second line are scanned in the same way.

FIG. 2 shows a pattern of the spots of the laser beam which has been scanned over the phosphor plate by using the radiation image reading apparatus according to the prior art described above. More specifically, the size $l_x$ of respective pixels 41, 42, 43, ... of the phosphor plate 4 in the main scanning direction X is decided depending on the sampling pitch in the A/D converter 10, and the size $l_y$ of the pixels in the sub-scanning direction Y is decided by the shifting pitch of the phosphor plate 4 in the sub-scanning direction by the transferring means. Since the laser beam is deflected by the deflector 2 and continuously irradiated on the plate 4 in the main direction X, a plurality of spots of the laser beam would be generated in one pixel or such spots might be generated over the adjacent pixel in the main scanning direction X as shown in FIG. 2.

However, as is well known, the accelerated phosphor light has decay characteristics and scanning by the reading apparatus is of the so-called destructive scanning type which means the light emission from the phosphor plate will decrease in inverse proportion to the increase of the irradiation value of the excitation light. Therefore if the spots of the laser beam are continuously formed beyond a particular pixel to be read out at the current time as shown in FIG. 2, sharpness of the reproduced image in the main scanning direction will be rather inferior to that in the sub-scanning direction.

SUMMARY OF THE INVENTION

An object of the present invention is to eliminate the problems set forth above, and to provide a radiation image reading apparatus capable of attaining a high resolution of image formed from image information stored in a storage phosphor plate in the main scanning direction almost as good as in the sub-scanning direction.

A feature of the present invention is that control means are provided in a radiation image reading apparatus to cause one spot of the laser beam to be generated for each pixel of a storage phosphor plate, whereby the image resolution in the main scanning direction can be enhanced to the same degree as in the sub-scanning direction. The control means includes an optical shutter disposed between a laser beam source and a deflector for intermittently shutting the laser beam or a pinhole member having a plurality of pin holes arranged in rows and disposed between a deflector and a storage phosphor plate.

Another feature of the present invention is that an integrating means is incorporated in the electrical signal path in the reading apparatus to integrate almost all the signals corresponding to the phosphor light including decay emission generated by one irradiation of the excitation pulse light, whereby an S/N ratio can be enhanced to obtain a higher resolution image.

BRIEF DESCRIPTION OF THE DRAWINGS

FIG. 2 is an explanatory view showing the patterns of laser beam spots formed on a phosphor plate by the apparatus according to the prior art shown in FIG. 1;

FIG. 5 shows output waveform diagrams of the signals at various points along the circuit of the embodiment shown in FIG. 4;

FIG. 6 is an explanatory view showing the patterns of laser beam spots which are formed on a phosphor plate by the embodiment as shown in FIG. 3 or 4.

DESCRIPTION OF THE PREFERRED EMBODIMENT

Figure 1:
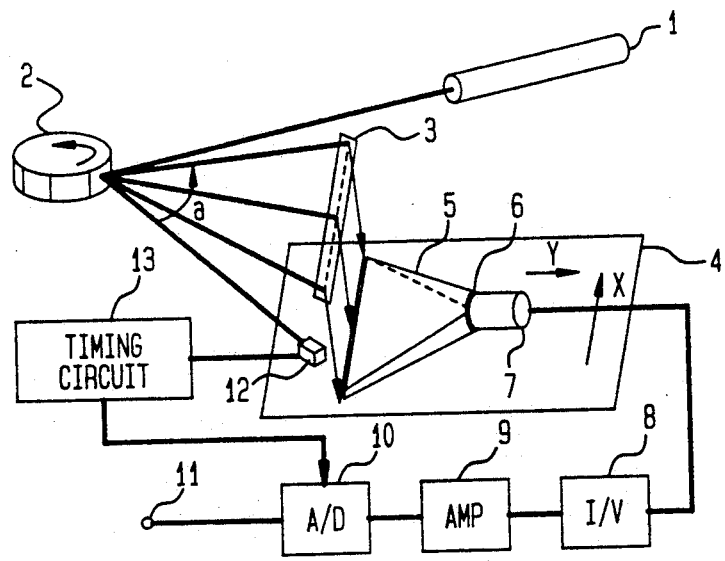
FIG. 1 is a schematic explanatory view of a radiation image reading apparatus according to the prior art.
Figure 3:
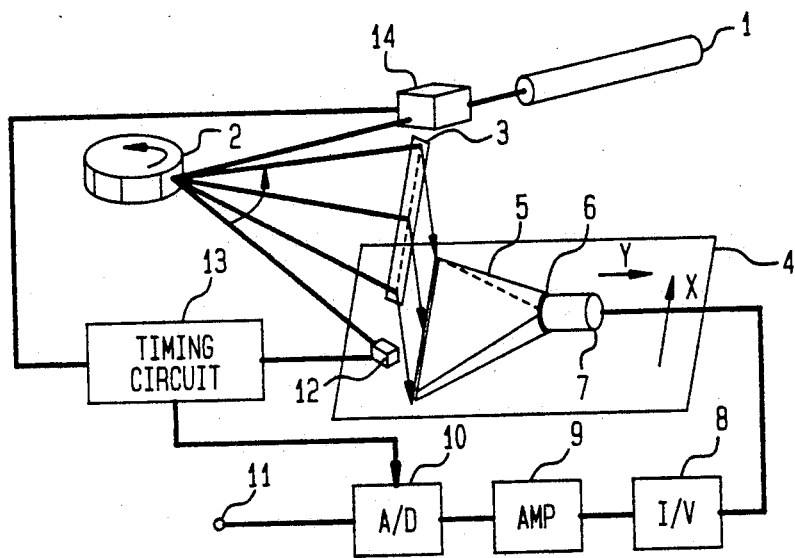
FIG. 3 is a schematic explanatory view of an embodiment of the present invention.

Referring now to FIG. 3, there is shown in schematic explanatory form an embodiment of the present invention. In the drawing, the same elements as those employed in the prior art apparatus shown in FIG. 1 are denoted by the same reference numerals.

An optical shutter 14 is interposed in the laser beam passage between the laser beam source 1 and the light deflector 2. The shutter 14 is designed to be opened or closed under the control of signals output from the timing circuit 13.

The optical shutter 14 consists of elements such as acoustic optical modulator (AOM) or the like which are capable of opening or closing the passage for the laser beam at high speed and the timing of opening or closing of the optical shutter 14 is so set that the decayed light of the phosphor light derived by the laser beam which has irradiated the immediately foregoing pixel will not influence the reading of the current pixel being read out. Accordingly, the timing circuit 13 needs to provide the opening/closing timing signals so set as above described to the optical shutter 14. The A/D converter 10 is controlled in the same way as the prior art by the signals from the timing circuit 13 to be operable for A/D conversion, so that the converter executes conversion operation in every cycle corresponding to the opening and closing cycle of the shutter 14, or the A/D converter 10 is so controlled as to execute one conversion operation every time the shutter 14 is opened. It is to be noted in this instance that the operational timing of the A/D converter 10 is required to be somewhat delayed from the opening time of the shutter 14 in consideration of a certain delay in the passage of the image signals from the photo-multiplier 7 to the A/D converter 10.

Figure 4:
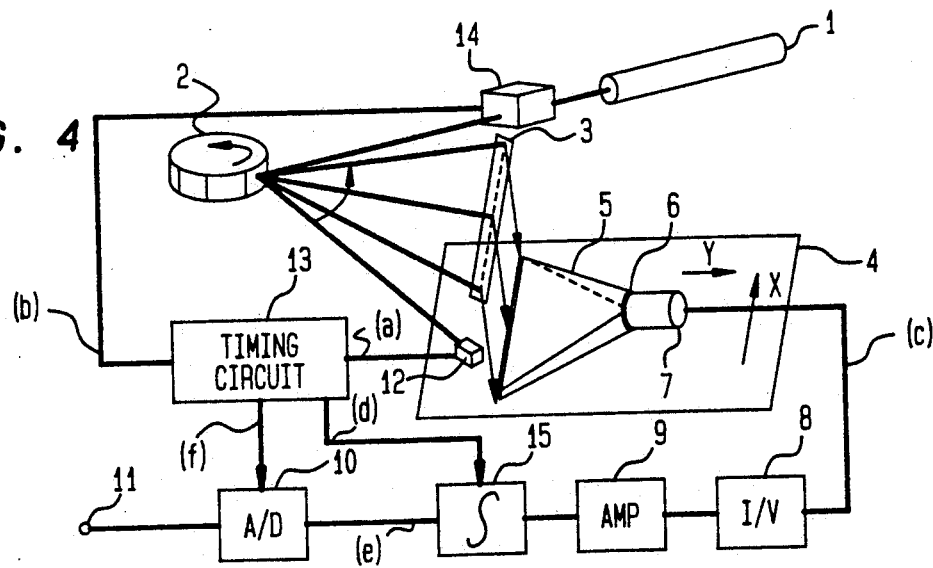
FIG. 4 is a schematic explanatory view of another embodiment of the present invention.

Another embodiment of the present invention is illustrated in FIG. 4. According to this embodiment, an integrating circuit 15 is added to the apparatus according to the first embodiment shown in FIG. 3. The integrating circuit is adapted to integrate the output signals from the amplifier 9 and output the integrated signals to A/D converter 10. The integrating circuit 15 is also controlled by the timing circuit 13 in respect of the integrating timing, or the charging/discharging timing. This charging/discharging timing is so set that not only the signal for the phosphor light which is generated when the excitation light is irradiated but also the signal for the decayed light of the phosphor light emitted from the phosphor plate 4 after the excitation light has been shut off, may be integrated and the charge at the circuit 15 will be momentarily discharged after each conversion operation has been executed by the A/D converter 10 in order to reset the integrating circuit 15.

FIG. 5 illustrates waveform diagrams of the timing output signals and the image information signals provided by the principal part of the apparatus shown in FIG. 4. In FIG. 5, (a) illustrates the line start signal generated when the line start sensor 12 has detected the laser beam, (b) illustrates the timing signals for opening and closing of the optical shutter 14 provided by the timing circuit 13, (c) illustrates the intensity of the phosphor light generated in the condition when the pixels in a line of the phosphor plate 4 are intermittently irradiated in order, (d) illustrates the integration timing signals provided from the timing circuit 13 to the integrating circuit 15, (e) illustrates the output signals from the integrating circuit 15 and (f) illustrates the operational timing signals to the A/D conversion circuit 10.

Figure 7:
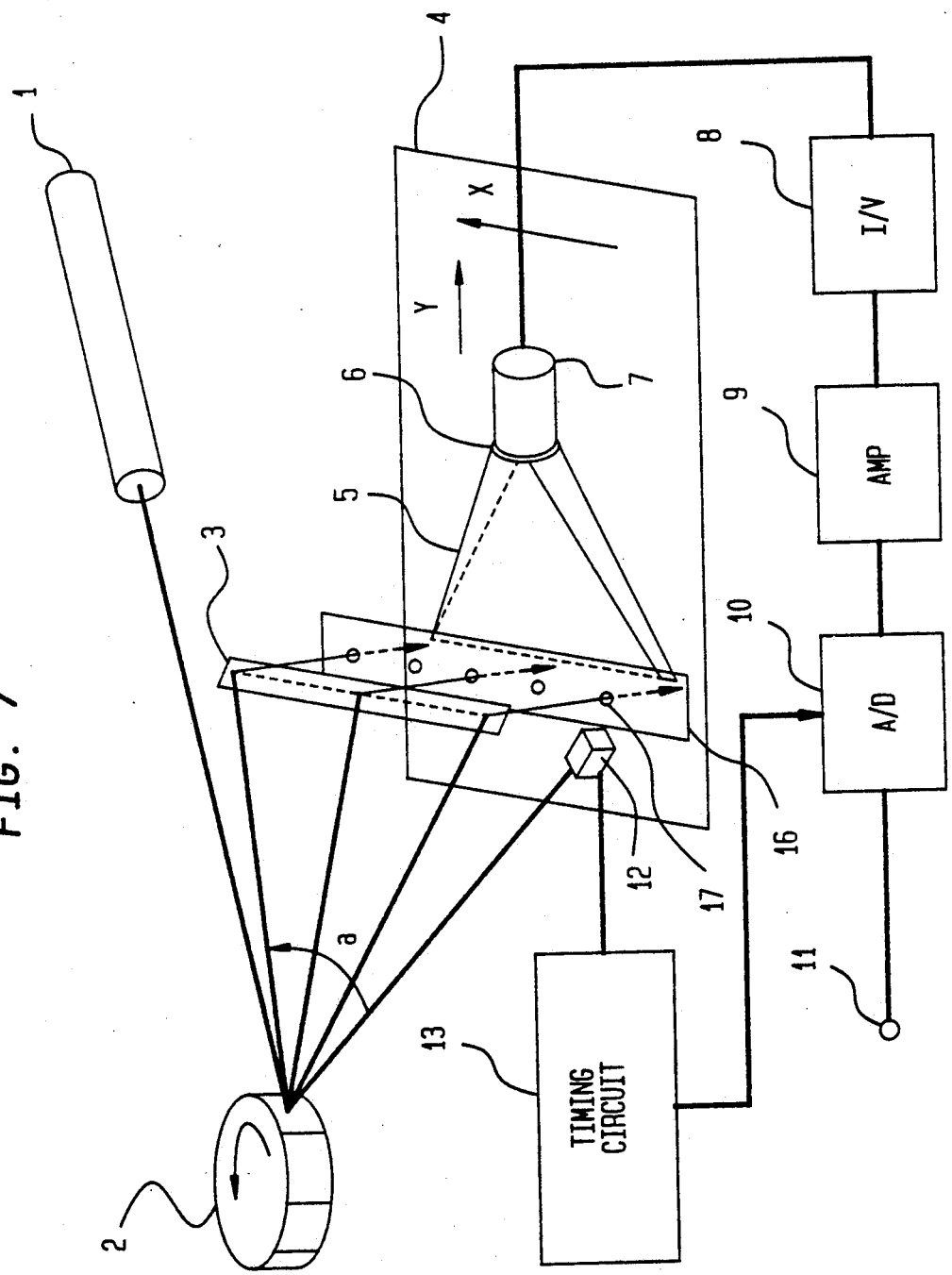
FIG. 7 is a schematic explanatory view of still another embodiment of the present invention.

According to the embodiments shown in FIGS. 3 and 4, although an optical shutter is provided at the front stage of the light deflector 2 is used similar effects may also be attained if, as is shown in FIG. 7, a pin-hole member 16 having a plurality of pin holes 17 enabling the laser beam to pass therethrough and arranged in rows provided at the rear stage of the light deflector 2 so as to form a laser beam spot for each pixel, in place of the optical shutter.

The reading apparatus described above is capable of irradiating the laser beam spots on the phosphor plate in the pattern as shown in FIG. 6, namely, one laser beam spot for each pixel in the main scanning direction as well as the sub-scanning direction.

It is further understood by those skilled in the art that the foregoing description are preferred embodiments of the disclosed device and that various changes and modifications may be made in the invention without departing from the spirit and scope thereof.

What is claimed:

1. An apparatus for reading out radiation pixel image information stored on a storage phosphor plate, comprising:

light beam scanning means for scanning said phosphor plate with an excitation light beam;

detecting means for detecting a phosphor light generated from said phosphor plate by the irradiation of said excitation light beam and for outputting an electrical image signal corresponding to the stored image information for each of the pixels of said phosphor plate, and detecting means including an A/D converting means for converting such electrical image signal obtained by detecting said phosphor light to a digital image signal; and control means including a pin-hole member positioned between the light beam scanning means and the phosphor plate, said pin-hole member having a plurality of pin-holes arranged in line for passing said light beam through said pin holes in sequence, said control means controlling said light beam scanning means to provide one beam spot for each of said pixels such that said electrical signal output from said detecting means includes only the information recorded in the current pixel to be read out.

2. The apparatus according to claim 1, wherein said light beam scanning means comprise a laser beam source for emitting said light beam and deflector means for deflecting said light beam to scan said phosphor plate, and said pin-hole member is disposed after said deflecting means.

3. An apparatus for reading out radiation pixel image information stored on a storage phosphor plate, comprising:

light beam scanning means for scanning said phosphor plate with an excitation light beam;

detecting means for detecting a phosphor light generated from said phosphor plate by the irradiation of said excitation light beam and for outputting an electrical image signal corresponding to the stored image information for each of the pixels of said phosphor plate; and a pin-hole member positioned between the light beam scanning means and the phosphor plate, said pin-hole member having a plurality of pin holes arranged in line for passing said light beam through said pin holes in sequence for controlling said light beam to provide one beam spot for each of said pixels such that said electrical signal output from said detecting means includes only the information recorded in the current pixel to be read out.

* * * * *